United States Patent
Gao et al.

(10) Patent No.: US 10,817,432 B2
(45) Date of Patent: Oct. 27, 2020

(54) MEMORY ADDRESS ASSIGNMENT METHOD FOR VIRTUAL MACHINE AND APPARATUS

(71) Applicant: Huawei Technologies Co., Ltd., Shenzhen (CN)

(72) Inventors: Meng Gao, Shanghai (CN); Kunpeng Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 16/054,636

(22) Filed: Aug. 3, 2018

(65) Prior Publication Data
US 2018/0341595 A1    Nov. 29, 2018

Related U.S. Application Data

(63) Continuation of application No. PCT/CN2017/071928, filed on Jan. 20, 2017.

(30) Foreign Application Priority Data

Feb. 3, 2016 (CN) .......................... 2016 1 0077690

(51) Int. Cl.
*G06F 12/00* (2006.01)
*G06F 13/00* (2006.01)
(Continued)

(52) U.S. Cl.
CPC ...... *G06F 12/1009* (2013.01); *G06F 9/45558* (2013.01); *G06F 11/073* (2013.01);
(Continued)

(58) Field of Classification Search
CPC . G06F 12/1009; G06F 11/073; G06F 12/0246
See application file for complete search history.

(56) References Cited

U.S. PATENT DOCUMENTS

2009/0248958 A1    10/2009    Tzeng
2010/0241785 A1     9/2010    Chen et al.
(Continued)

FOREIGN PATENT DOCUMENTS

CN    101158924 A    4/2008
CN    101937321 A    1/2011
(Continued)

OTHER PUBLICATIONS

Machine Translation and Abstract of Chinese Publication No. CN101158924, Apr. 9, 2008, 17 pages.
(Continued)

*Primary Examiner* — Sean D Rossiter
(74) *Attorney, Agent, or Firm* — Conley Rose, P.C.

(57) ABSTRACT

A memory address assignment method and a virtual machine that runs on a host machine. The host machine includes a physical memory area with power failure protection, the virtual machine includes a virtual memory area with power failure protection. The method includes determining that a virtual memory address in which a page fault occurs in the virtual machine belongs to the virtual memory area with power failure protection, and assigning a physical memory address of the host machine from the physical memory area with power failure protection to the virtual memory address.

20 Claims, 3 Drawing Sheets

(51) Int. Cl.
*G06F 12/1009* (2016.01)
*G06F 12/02* (2006.01)
*G06F 9/455* (2018.01)
*G06F 11/07* (2006.01)

(52) U.S. Cl.
CPC .......... *G06F 12/02* (2013.01); *G06F 12/0238* (2013.01); *G06F 12/0246* (2013.01); *G06F 2009/45583* (2013.01); *G06F 2212/151* (2013.01); *G06F 2212/205* (2013.01); *G06F 2212/657* (2013.01); *G06F 2212/7201* (2013.01)

(56) References Cited

U.S. PATENT DOCUMENTS

| | | | |
|---|---|---|---|
| 2012/0047313 A1 | 2/2012 | Sinha et al. | |
| 2012/0137055 A1 | 5/2012 | Lee et al. | |
| 2013/0024940 A1 | 1/2013 | Hutchins et al. | |
| 2014/0237469 A1 | 8/2014 | Tsirkin | |
| 2018/0004675 A1* | 1/2018 | Shanbhogue | G06F 12/1009 |
| 2018/0341595 A1* | 11/2018 | Gao | G06F 9/45558 |
| 2019/0042463 A1* | 2/2019 | Shanbhogue | G06F 21/53 |

FOREIGN PATENT DOCUMENTS

| | | | |
|---|---|---|---|
| CN | 102662869 A | 9/2012 | |
| CN | 104750623 A | 7/2015 | |
| CN | 105117285 A | 12/2015 | |
| CN | 105159742 A | 12/2015 | |
| EP | 2256638 A1 | 12/2010 | |

OTHER PUBLICATIONS

Machine Translation and Abstract of Chinese Publication No. CN102662869, Sep. 12, 2012, 18 pages.
Foreign Communication From a Counterpart Application, PCT Application No. PCT/CN2017/071928, English Translation of International Search Report dated Mar. 28, 2017, 2 pages.
Foreign Communication From a Counterpart Application, PCT Application No. PCT/CN2017/071928, English Translation of Written Opinion dated Mar. 28, 2017, 4 pages.
Foreign Communication From a Counterpart Application, European Application No. 17746813.9, Extended European Search Report dated Dec. 20, 2018, 9 pages.
Machine Translation and Abstract of Chinese Publication No. CN101937321, Jan. 5, 2011, 8 pages.
Machine Translation and Abstract of Chinese Publication No. CN104750623, Jul. 1, 2015, 41 pages.
Machine Translation and Abstract of Chinese Publication No. CN105117285, Dec. 2, 2015, 9 pages.
Machine Translation and Abstract of Chinese Publication No. CN105159742, Dec. 16, 2015, 19 pages.
Foreign Communication From a Counterpart Application, Chinese Application No. 201610077690.X, Chinese Office Action dated Jan. 6, 2020, 8 pages.

\* cited by examiner

MEMORY ADDRESS ASSIGNMENT METHOD FOR VIRTUAL MACHINE AND APPARATUS

CROSS-REFERENCE TO RELATED APPLICATIONS

This application is a continuation of International Patent Application No. PCT/CN2017/071928 filed on Jan. 20, 2017, which claims priority to Chinese Patent Application No. 201610077690.X filed on Feb. 3, 2016. The disclosures of the aforementioned applications are hereby incorporated by reference in their entireties.

TECHNICAL FIELD

This application relates to the memory field, and in particular, to a memory address assignment method for a virtual machine and an apparatus.

BACKGROUND

In other approaches, to assign a physical memory address of a host machine from a physical memory area with power failure protection to a virtual memory address that is of a virtual machine and that has a power failure protection requirement, the host machine needs to perform three times of mapping. First, a physical memory address in the physical memory area with power failure protection is mapped to a character device, then the character device is mapped to a peripheral component interconnect (PCI) device, and finally the PCI device is mapped to a virtual memory address of the virtual machine. However, in this manner, three times of mapping are required to assign the physical memory address that is with power failure protection and of the host machine to the virtual memory address that is of the virtual machine and that has a power failure protection requirement, and assignment efficiency is low.

SUMMARY

The embodiment of the present disclosure is intended to provide a memory address assignment method for a virtual machine and an apparatus in order to improve efficiency of assigning a physical memory address that is with power failure protection and of a host machine to a virtual memory address that is of a virtual machine and that has a power failure protection requirement.

According to a first aspect, when a page fault occurs in a virtual machine, a host machine determines that a virtual memory address in which a page fault occurs in the virtual machine belongs to a virtual memory area with power failure protection, and assigns a physical memory address of the host machine from a physical memory area with power failure protection to the virtual memory address of the virtual machine.

After determining that the virtual memory address in which a page fault occurs in the virtual machine belongs to the virtual memory area with power failure protection, the host machine directly assigns the physical memory address of the host machine from the physical memory area with power failure protection to the virtual memory address of the virtual machine, thereby improving efficiency of assigning a physical memory address that is with power failure protection and of the host machine to a virtual memory address that is of the virtual machine and that has a power failure protection requirement.

With reference to the first aspect, in a first possible implementation of the first aspect, the host machine stores information that the virtual memory area address belongs to the virtual memory area with power failure protection, and when a page fault occurs in the virtual machine, the host machine queries the information according to the virtual memory address in which a page fault occurs, and determines that the virtual memory address belongs to the virtual memory area with power failure protection.

With reference to the first possible implementation of the first aspect, in a second possible implementation of the first aspect, a configuration file of the virtual machine stores the information that the virtual memory area address belongs to the virtual memory area with power failure protection, and when a page fault occurs in the virtual machine, the host machine queries the information in the configuration file according to the virtual memory address in which a page fault occurs, and determines that the virtual memory address belongs to the virtual memory area with power failure protection.

With reference to the first possible implementation of the first aspect, in a third possible implementation of the first aspect, a shared file of the host machine and the virtual machine stores the information that the virtual memory area address belongs to the virtual memory area with power failure protection, and when a page fault occurs in the virtual machine, the host machine queries the information in the shared file according to the virtual memory address in which a page fault occurs, and determines that the virtual memory address belongs to the virtual memory area with power failure protection.

In this implementation, the shared file can be accessed by both the host machine and the virtual machine. Therefore, after the host machine determines the information that the virtual memory area address belongs to the virtual memory area with power failure protection, the virtual machine may further modify, according to an actual situation, the information that the virtual memory area address belongs to the virtual memory area with power failure protection.

With reference to the first aspect, in a fourth possible implementation of the first aspect, the host machine pre-stores information about a virtual memory address with power failure protection that needs to be accessed by a process in the virtual machine, and when a page fault occurs in the virtual machine, the host machine queries the information according to the virtual memory address in which a page fault occurs, and determines that the virtual memory address belongs to the virtual memory area with power failure protection.

With reference to any one of the first aspect to the fourth possible implementation, in a fifth possible implementation of the first aspect, the assigning, by the host machine, a physical memory address of the host machine from the physical memory area with power failure protection to the virtual memory address further includes establishing, by the host machine, a mapping relationship between the virtual memory address and the physical memory address of the host machine.

With reference to any one of the first aspect to the fourth possible implementation, in a sixth possible implementation of the first aspect, the assigning, by the host machine, a physical memory address of the host machine from the physical memory area with power failure protection to the virtual memory address further includes establishing, by the host machine, a mapping relationship between a physical memory address of the virtual machine and the physical memory address of the host machine, where the virtual memory address is mapped to the physical memory address of the virtual machine.

According to a second aspect, the embodiment of the present disclosure provides a host machine, and the host machine is configured to perform the method according to the first aspect or any possible implementation of the first aspect. In an implementation, a virtual machine runs on the host machine, the host machine includes a physical memory area with power failure protection, the virtual machine includes a virtual memory area with power failure protection, and the host machine includes units configured to perform the method according to the first aspect or any possible implementation of the first aspect. In another implementation, the host machine includes a processor and a memory, a virtual machine runs on the host machine, the memory of the host machine includes a physical memory area with power failure protection, the virtual machine includes a virtual memory area with power failure protection, the processor communicates with the memory, and the processor is configured to perform the method according to the first aspect or any possible implementation of the first aspect. In another implementation, the host machine includes a memory management unit (MMU) and a memory, a virtual machine runs on the host machine, the memory of the host machine includes a physical memory area with power failure protection, the virtual machine includes a virtual memory area with power failure protection, the MMU communicates with the memory, and the MMU is configured to perform the method according to the first aspect or any possible implementation of the first aspect. Further, the host machine in the embodiment of the present disclosure is a server.

According to a third aspect, a computer readable medium is provided, and configured to store a computer program, where the computer program includes an instruction used to perform the method according to the first aspect or any possible implementation of the first aspect.

DESCRIPTION OF EMBODIMENTS

The following describes the embodiment of the present disclosure in detail with reference to accompanying drawings and embodiments.

Figure 1:
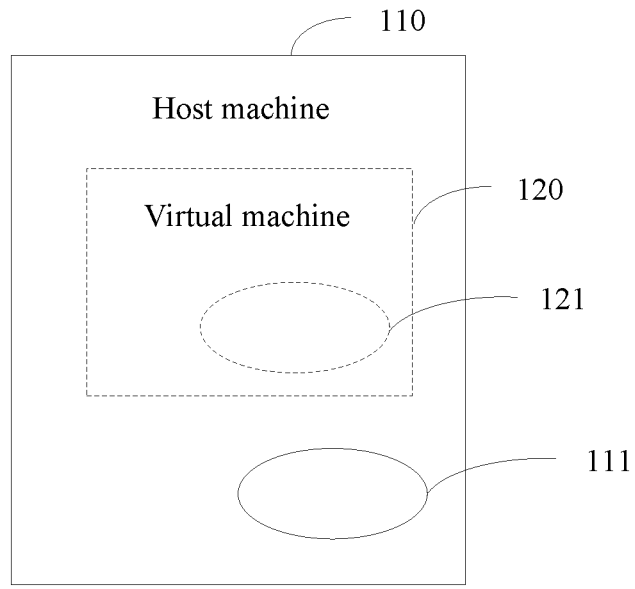
FIG. 1 is an application scenario according to an embodiment of the present disclosure.

As shown in FIG. 1, the following first describes an environment in which a memory address assignment method for a virtual machine runs. A virtual machine 120 runs on a host machine 110, the host machine 110 includes a physical memory area 111 with power failure protection, the virtual machine 120 includes a virtual memory area 121 with power failure protection. The host machine 110 may be a server, a workstation, a portable computer, a desktop computer, a tablet computer, or the like. The physical memory area 111 with power failure protection is a part or all of a physical memory of the host machine 110. Data stored in the physical memory area 111 with power failure protection is still kept during a power failure. Further, a backup power device may store the data in the physical memory area 111 with power failure protection to a non-volatile device. Alternatively, in this embodiment of the present disclosure, the physical memory area 111 with power failure protection means that a memory device that provides the physical memory area with power failure protection is a non-volatile memory device, and data in the memory device is not lost after a power failure. The virtual memory area 121 with power failure protection is a part or all of a virtual memory of the virtual machine 120. When physical memory addresses of the host machine 110 are being assigned, a physical memory address in the physical memory area 111 with power failure protection is assigned to the virtual memory area 121 with power failure protection.

Figure 2:
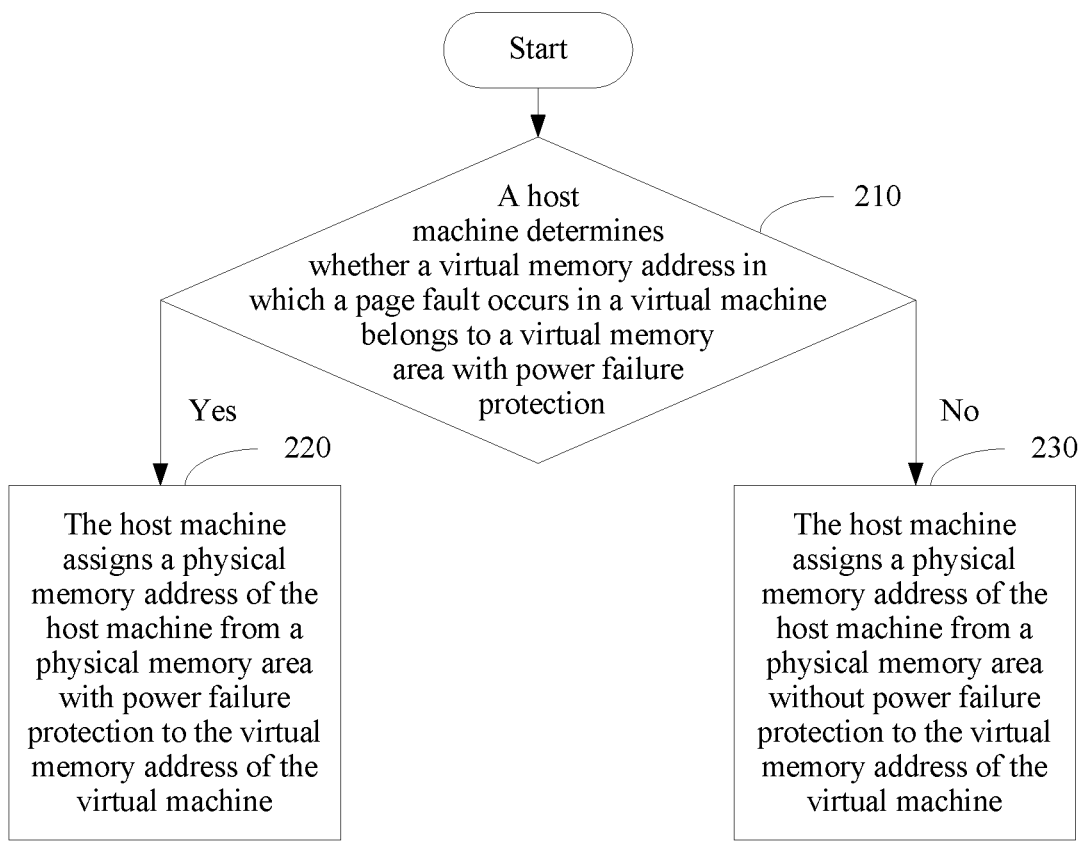
FIG. 2 is a flowchart of a memory address assignment method for a virtual machine according to an embodiment of the present disclosure.

As shown in FIG. 2, in step 210, when a page fault occurs in a virtual machine, a host machine determines whether a virtual memory address in which a page fault occurs in the virtual machine belongs to a virtual memory area with power failure protection. If the virtual memory address belongs to the virtual memory area with power failure protection, step 220 is performed. The step 220 includes that the host machine assigns a physical memory address of the host machine from a physical memory area with power failure protection to the virtual memory address of the virtual machine. If the virtual memory address does not belong to the virtual memory area with power failure protection, step 230 is performed. The step 230 includes that the host machine assigns a physical memory address of the host machine from a physical memory area without power failure protection to the virtual memory address of the virtual machine.

In this embodiment of the present disclosure, after determining that the virtual memory address in which a page fault occurs in the virtual machine belongs to the virtual memory area with power failure protection, the host machine directly assigns the physical memory address of the host machine from the physical memory area with power failure protection to the virtual memory address of the virtual machine, thereby improving efficiency of assigning a physical memory address that is with power failure protection and of the host machine to a virtual memory address that is of the virtual machine and that has a power failure protection requirement.

In a specific embodiment of the present disclosure, information that the virtual memory area address belongs to the virtual memory area with power failure protection may be a start address and a length of the virtual memory area with power failure protection. Therefore, the host machine may determine a location of the virtual memory area with power failure protection according to the start address and the length of the virtual memory area with power failure protection, and when a page fault occurs in the virtual machine, the host machine compares a virtual memory address in which a page fault occurs with the location of the virtual memory area with power failure protection in order to determine whether the virtual memory address in which a page fault occurs in the virtual machine belongs to the virtual memory area with power failure protection. It can be understood that the information that the virtual memory area address belongs to the virtual memory area with power failure protection may be alternatively a start address and an end address of the virtual memory area with power failure protection, an end address and a length of the virtual memory area with power failure protection, or the like.

In a specific embodiment of the present disclosure, a method for determining, by the host machine, whether the virtual memory address in which a page fault occurs in the virtual machine belongs to the virtual memory area with power failure protection is as follows. The host machine stores the information that the virtual memory area address belongs to the virtual memory area with power failure protection. When a page fault occurs in the virtual machine, the host machine queries the information according to the virtual memory address applied by the virtual machine, and determines, according to the information, whether the virtual memory address of the virtual machine belongs to the virtual memory area with power failure protection.

In specific implementation, that the host machine stores the information that the virtual memory area address belongs to the virtual memory area with power failure protection may be as follows. When the host machine establishes the virtual machine, the host machine stores, in a configuration file of the virtual machine, the information that the virtual memory area address belongs to the virtual memory area with power failure protection. The configuration file of the virtual machine is a key parameter that records the virtual machine, for example, a file of a central processing unit (CPU) parameter, a memory parameter, or a hard disk parameter. When a page fault occurs in the virtual machine, the host machine may query the configuration file of the virtual machine according to the virtual memory address of the virtual machine, and determine whether the virtual memory address of the virtual machine belongs to the virtual memory area with power failure protection.

In specific implementation, alternatively, that the host machine stores the information that the virtual memory area address belongs to the virtual memory area with power failure protection may be as follows. The host machine stores, in a shared file, the information that the virtual memory area address belongs to the virtual memory area with power failure protection. The shared file is a file that can be accessed by both the host machine and the virtual machine, and may be a txt file, a word file, or the like. When a page fault occurs in the virtual machine, the host machine may query the shared file according to the virtual memory address of the virtual machine, and determine whether the virtual memory address of the virtual machine belongs to the virtual memory area with power failure protection.

It can be understood that because the shared file can be accessed by both the host machine and the virtual machine, after the host machine determines that the information that the virtual memory area address belongs to the virtual memory area with power failure protection is stored in the shared file, the virtual machine may further access the shared file, and modify, in the shared file according to an actual situation, the information that the virtual memory area address belongs to the virtual memory area with power failure protection.

In a specific embodiment of the present disclosure, a method for determining, by the host machine, whether the virtual memory address in which a page fault occurs in the virtual machine belongs to the virtual memory area with power failure protection is as follows. The host machine stores information about a virtual memory address with power failure protection that needs to be accessed by a process in the virtual machine. When a page fault occurs in the virtual machine, the host machine queries the information according to the virtual memory address applied by the virtual machine, and determines that the virtual memory address applied by the virtual machine is the virtual memory address accessed by the process.

In a specific embodiment of the present disclosure, that the host machine assigns a physical memory address of the host machine from a physical memory area with power failure protection to the virtual memory address of the virtual machine further includes the following. The host machine establishes a mapping relationship between the virtual memory address and the physical memory address of the host machine in a shadow page table manner, or the host machine establishes a mapping relationship between a physical memory address of the virtual machine and the physical memory address of the host machine in an extended page table (EPT) manner, where the virtual memory address is mapped to the physical memory address of the virtual machine.

Figure 3:
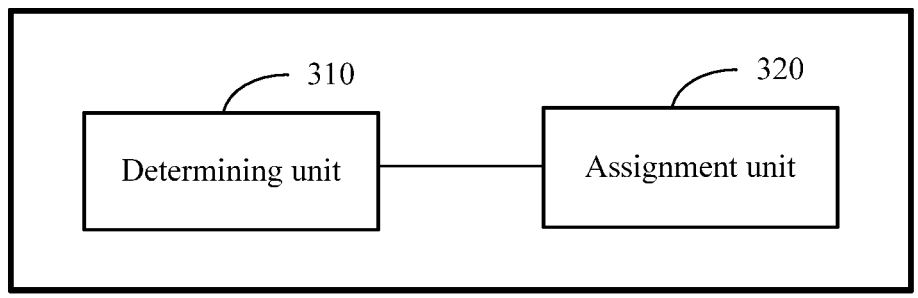
FIG. 3 is a schematic structural diagram of a host machine according to an embodiment of the present disclosure.

Referring to FIG. 3, FIG. 3 is a schematic structural diagram of a host machine according to an embodiment of the present disclosure. A virtual machine runs on the host machine, the host machine includes a physical memory area with power failure protection, the virtual machine includes a virtual memory area with power failure protection, and the host machine includes a determining unit 310 and an assignment unit 320.

The determining unit 310 is configured to determine that a virtual memory address in which a page fault occurs in the virtual machine belongs to the virtual memory area with power failure protection.

The assignment unit 320 is configured to assign a physical memory address of the host machine from the physical memory area with power failure protection to the virtual memory address.

In this embodiment of the present disclosure, after the determining unit 310 determines that the virtual memory address in which a page fault occurs in the virtual machine belongs to the virtual memory area with power failure protection, the assignment unit 320 directly assigns the physical memory address of the host machine from the physical memory area with power failure protection to the virtual memory address of the virtual machine, thereby improving efficiency of assigning a physical memory address that is with power failure protection and of the host machine to a virtual memory address that is of the virtual machine and that has a power failure protection requirement.

In a specific embodiment of the present disclosure, information that the virtual memory area address belongs to the virtual memory area with power failure protection may be a start address and a length of the virtual memory area with power failure protection. Therefore, the determining unit 310 may determine a location of the virtual memory area with power failure protection according to the start address and the length of the virtual memory area with power failure protection, and when a page fault occurs in the virtual machine, the determining unit 310 compares the virtual memory address in which a page fault occurs with the location of the virtual memory area with power failure protection in order to determine whether the virtual memory address in which a page fault occurs in the virtual machine belongs to the virtual memory area with power failure protection. It can be understood that the information that the virtual memory area address belongs to the virtual memory area with power failure protection may be alternatively a start address and an end address of the virtual memory area with power failure protection, an end address and a length of the virtual memory area with power failure protection, or the like.

In a specific embodiment of the present disclosure, that the determining unit 310 is configured to determine that the virtual memory address in which a page fault occurs in the virtual machine belongs to the virtual memory area with power failure protection is as follows. The host machine stores the information that the virtual memory area address belongs to the virtual memory area with power failure protection. When a page fault occurs in the virtual machine, the determining unit 310 queries the information according to the virtual memory address applied by the virtual machine, and determines, according to the information, whether the virtual memory address of the virtual machine belongs to the virtual memory area with power failure protection.

In specific implementation, that the host machine stores the information that the virtual memory area address belongs to the virtual memory area with power failure protection may be as follows. When the host machine establishes the virtual machine, the host machine stores, in a configuration file of the virtual machine, the information that the virtual memory area address belongs to the virtual memory area with power failure protection. The configuration file of the virtual machine is a key parameter that records the virtual machine, for example, a file of a CPU parameter, a memory parameter, or a hard disk parameter. When a page fault occurs in the virtual machine, the determining unit 310 may query the configuration file of the virtual machine according to the virtual memory address of the virtual machine, and determine whether the virtual memory address of the virtual machine belongs to the virtual memory area with power failure protection.

In specific implementation, alternatively, that the host machine stores the information that the virtual memory area address belongs to the virtual memory area with power failure protection may be as follows. The host machine stores, in a shared file, the information that the virtual memory area address belongs to the virtual memory area with power failure protection. The shared file is a file that can be accessed by both the host machine and the virtual machine, and may be a txt file, a word file, or the like. When a page fault occurs in the virtual machine, the determining unit 310 may query the shared file according to the virtual memory address of the virtual machine, and determine whether the virtual memory address of the virtual machine belongs to the virtual memory area with power failure protection.

It can be understood that because the shared file can be accessed by both the host machine and the virtual machine, after the host machine determines that the information that the virtual memory area address belongs to the virtual memory area with power failure protection is stored in the shared file, the virtual machine may further access the shared file, and modify, in the shared file according to an actual situation, the information that the virtual memory area address belongs to the virtual memory area with power failure protection.

In a specific embodiment of the present disclosure, that the determining unit 310 is configured to determine that the virtual memory address in which a page fault occurs in the virtual machine belongs to the virtual memory area with power failure protection is as follows. The host machine stores information about a virtual memory address with power failure protection that needs to be accessed by a process in the virtual machine. When a page fault occurs in the virtual machine, the determining unit 310 queries the information according to the virtual memory address applied by the virtual machine, and determines that the virtual memory address applied by the virtual machine is the virtual memory address accessed by the process.

In a specific embodiment of the present disclosure, that the assignment unit 320 is configured to assign a physical memory address of the host machine from a physical memory area with power failure protection to the virtual memory address includes the following. The assignment unit 320 establishes a mapping relationship between the virtual memory address and the physical memory address of the host machine in a shadow page table manner, or the assignment unit 320 establishes a mapping relationship between a physical memory address of the virtual machine and the physical memory address of the host machine in an EPT manner, where the virtual memory address is mapped to the physical memory address of the virtual machine.

Figure 4:
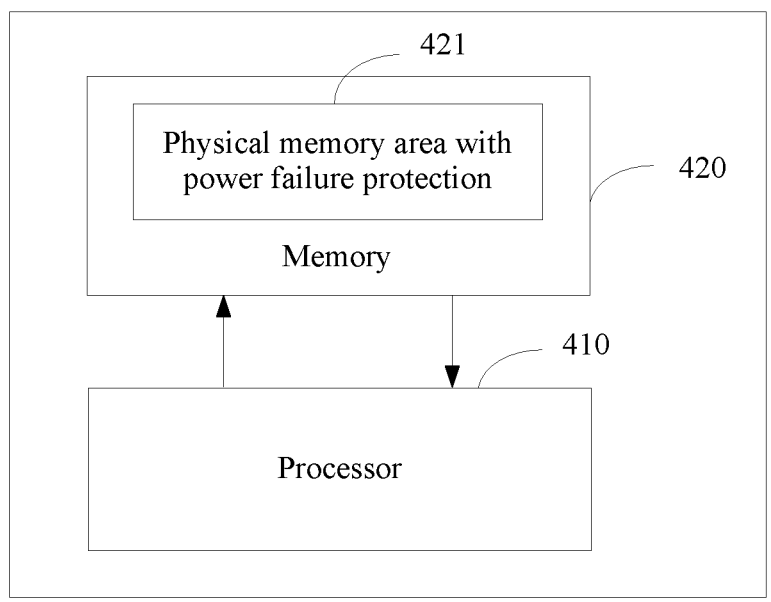
FIG. 4 is a schematic structural diagram of another host machine according to an embodiment of the present disclosure.

Referring to FIG. 4, FIG. 4 is a schematic structural diagram of another host machine according to an embodiment of the present disclosure. The host machine includes a processor 410 and a memory 420, a virtual machine runs on the host machine, the memory 420 of the host machine includes a physical memory area 421 with power failure protection, the virtual machine includes a virtual memory area with power failure protection, the processor 410 communicates with the memory 420, and the processor 410 is configured to perform the steps in the foregoing embodiment of the present disclosure. A person skilled in the art may understand that a structure of the host machine shown in FIG. 4 does not constitute a limitation on the host machine, and the host machine may include more or fewer components than those shown in the figure, or a combination of some components, or different component arrangements.

Figure 5:
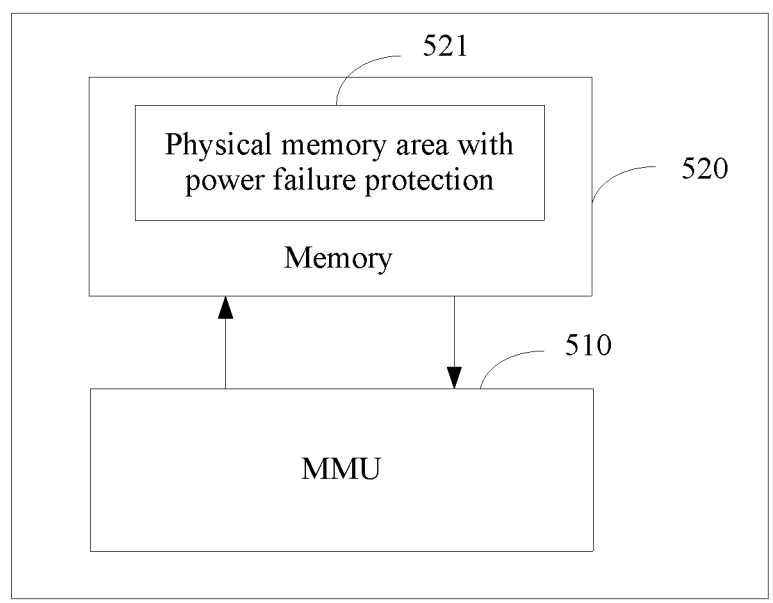
FIG. 5 is a schematic structural diagram of still another host machine according to an embodiment of the present disclosure.

Referring to FIG. 5, FIG. 5 is a schematic structural diagram of still another host machine according to an embodiment of the present disclosure. The host machine includes an MMU 510 and a memory 520, a virtual machine runs on the host machine, the memory 520 of the host machine includes a physical memory area 521 with power failure protection, the virtual machine includes a virtual memory area with power failure protection, the MMU 510 communicates with the memory 520, and the MMU 510 is configured to perform the steps in the foregoing embodiment of the present disclosure.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is claimed is:

1. A memory address assignment method for a virtual machine that runs on a host machine, comprising:
   determining, by the host machine, that a virtual memory address in which a page fault occurs in the virtual machine belongs to a virtual memory area with power failure protection the host machine comprising a physical memory area with the power failure protection, and the virtual machine comprising the virtual memory area with the power failure protection; and
   assigning, by the host machine, a physical memory address of the host machine from the physical memory area with the power failure protection to the virtual memory address.

2. The method of claim 1, wherein the host machine stores information of the virtual memory area, and determining that the virtual memory address in which the page fault occurs the virtual machine belongs to the virtual memory area with the power failure protection comprising:
querying, by the host machine, the information according to the virtual memory address; and
determining, by the host machine, that the virtual memory address belongs to the virtual memory area with the power failure protection.

3. The method of claim 2, wherein a configuration file of the virtual machine stores the information, and querying the information and determining that the virtual memory address belongs to the virtual memory area with the power failure protection comprising:
querying, by the host machine, the configuration file of the virtual machine according to the virtual memory address; and
determining, by the host machine, that the virtual memory address belongs to the virtual memory area with the power failure protection.

4. The method of claim 2, wherein a shared file of the host machine and the virtual machine stores the information, and querying the information and determining that the virtual memory address belongs to the virtual memory area with the power failure protection comprising:
querying, by the host machine, the shared file according to the virtual memory address; and
determining, by the host machine, that the virtual memory address belongs to the virtual memory area with power failure protection.

5. The method of claim 2, wherein the information comprises:
a start address and a length of the virtual memory area;
the start address and an end address of the virtual memory area; or
the end address and the length of the virtual memory area.

6. The method of claim 1, wherein the host machine stores information about a virtual memory address with the power failure protection that needs to be accessed by a process in the virtual machine, and determining that the virtual memory address in which the page fault occurs in the virtual machine belongs to the virtual memory area with the power failure protection comprising:
querying, by the host machine, the information according to the virtual memory address in which a page fault occurs; and
determining, by the host machine, that the virtual memory address in which a page fault occurs is within the virtual memory address accessed by the process.

7. The method of claim 1, wherein assigning the physical memory address from the physical memory area to the virtual memory address in which the page fault occurs comprises establishing, by the host machine, a mapping relationship between the virtual memory address in which the page fault occurs and the physical memory address of the host machine.

8. The method of claim 1, wherein assigning the physical memory address of the host machine from the physical memory area to the virtual memory address comprises establishing, by the host machine, a mapping relationship between the physical memory address of the virtual machine and the physical memory address of the host machine, and the virtual memory address being mapped to the physical memory address of the virtual machine.

9. A host machine, comprising:
a memory comprising a physical memory area with power failure protection and storing instructions; and
a processor coupled to the memory, the instructions causing the processor to be configured to:
determine that a virtual memory address in which a page fault occurs in a virtual machine belongs to a virtual memory area with the power failure protection, the virtual machine running on the host machine, and the virtual machine comprising the virtual memory area with the power failure protection; and
assign a physical memory address of the host machine from the physical memory area with the power failure protection to the virtual memory address.

10. The host machine of claim 9, wherein the host machine stores information of the virtual memory area, and when determining the virtual memory address in which the page fault occurs in the virtual machine belongs to the virtual memory area with the power failure protection, the instructions further causing the processor to be configured to:
query the information according to the virtual memory address; and
determine that the virtual memory address belongs to the virtual memory area with the power failure protection.

11. The host machine of claim 10, wherein a configuration file of the virtual machine stores the information, when querying the information and determining that the virtual memory address belongs to the virtual memory area with the power failure protection, the instructions further causing the processor to be configured to:
query the configuration file of the virtual machine according to the virtual memory address; and
determining that the virtual memory address belongs to the virtual memory area with the power failure protection.

12. The host machine of claim 10, wherein a shared file shared by the host machine and the virtual machine stores the information, and when querying the information and determining that the virtual memory address belongs to the virtual memory area with the power failure protection, the instructions further causing the processor to be configured to:
query the shared file according to the virtual memory address; and
determine that the virtual memory address belongs to the virtual memory area with the power failure protection.

13. The host machine of claim 10, wherein the information comprises:
a start address and a length of the virtual memory area;
the start address and an end address of the virtual memory area; or
the end address and the length of the virtual memory area.

14. The host machine of claim 9, wherein the host machine stores information about a virtual memory address with the power failure protection that needs to be accessed by a process in the virtual machine, and when determining that the virtual memory address in which the page fault occurs in the virtual machine belongs to the virtual memory area with the power failure protection, the instructions further causing the processor to be configured to:
query the information according to the virtual memory address in which the page fault occurs; and
determine that the virtual memory address in which the page fault occurs is within the virtual memory address accessed by the process.

15. The host machine of claim 9, wherein when assigning the physical memory address from the physical memory area to the virtual memory address in which the page fault occurs, the instructions further cause the processor to be configured to establish a mapping relationship between the virtual memory address in which the page fault occurs and the physical memory address of the host machine.

16. The host machine of claim 9, wherein when assigning the physical memory address of the host machine from the physical memory area to the virtual memory address, the instructions further cause the processor to be configured to establish a mapping relationship between the physical memory address of the virtual machine and the physical memory address of the host machine, and the virtual memory address being mapped to the physical memory address of the virtual machine.

17. A host machine, comprising:
- a memory comprising a physical memory area with power failure protection and storing instructions; and
- a memory management unit (MMU) coupled to the memory, the instructions causing the MMU to be configured to:
    - determine that a virtual memory address in which a page fault occurs in a virtual machine belongs to a virtual memory area with the power failure protection, the virtual machine running on the host machine, and the virtual machine comprising the virtual memory area with the power failure protection; and
    - assign a physical memory address of the host machine from the physical memory area with the power failure protection to the virtual memory address.

18. The host machine of claim 17, wherein the host machine stores information of the virtual memory area, and when determining the virtual memory address in which the page fault occurs in the virtual machine belonging to the virtual memory area with the power failure protection, the instructions further causing the MMU to be configured:
- query the information according to the virtual memory address; and
- determine that the virtual memory address belongs to the virtual memory area with the power failure protection.

19. The host machine of claim 18, wherein a configuration file of the virtual machine stores the information, and when querying the information and determining that the virtual memory address belonging to the virtual memory area with the power failure protection, the instructions further causing the MMU to be configured to:
- query the configuration file of the virtual machine according to the virtual memory address; and
- determine that the virtual memory address belongs to the virtual memory area with power failure protection.

20. The host machine of claim 19, wherein a shared file shared by the host machine and the virtual machine stores the information, and when querying the information and determining that the virtual memory address belongs to the virtual memory area with the power failure protection, the instructions further causing the MMU to be configured to:
- query the shared file according to the virtual memory address; and
- determine that the virtual memory address belongs to the virtual memory area with power failure protection.

* * * * *